(12) United States Patent
Vavrik et al.

(10) Patent No.: US 6,362,422 B1
(45) Date of Patent: Mar. 26, 2002

(54) ENCLOSURE FOR USE IN FIBER OPTIC MANAGEMENT SYSTEMS

(76) Inventors: Michael T. Vavrik, 6939 W. 154th Pl., Oak Forest, IL (US) 60452; Philip B. Chandler, Jr., 140 S. Maple, Frankfort, IL (US) 60423

( * ) Notice: Subject to any disclaimer, the term of this patent is extended or adjusted under 35 U.S.C. 154(b) by 0 days.

(21) Appl. No.: 09/587,100

(22) Filed: Jun. 2, 2000

(51) Int. Cl.[7] ................................................. H01J 5/00
(52) U.S. Cl. ............................ 174/50; 174/48; 174/66; 220/402; 220/241; 248/906; 439/535
(58) Field of Search ......................... 174/48, 50, 66, 174/67; 220/241; 361/600; 248/906, 49, 56, 68.1; 439/535

(56) References Cited

U.S. PATENT DOCUMENTS

| | | | |
|---|---|---|---|
| 4,158,754 A | 6/1979 | Yonezaki et al. | 179/98 |
| 4,665,546 A | 5/1987 | Brey et al. | 379/327 |
| 4,776,662 A | 10/1988 | Valleix | 350/96.2 |
| 4,898,448 A | 2/1990 | Cooper | 350/96.2 |
| 5,138,688 A | 8/1992 | Debortoli | 385/135 |
| 5,339,379 A | 8/1994 | Kutsch et al. | 385/135 |
| 5,363,465 A | 11/1994 | Korkowski et al. | 385/135 |
| 5,448,015 A | 9/1995 | Jamet et al. | 174/68.3 |
| 5,497,444 A | 3/1996 | Wheeler | 385/135 |
| 5,530,954 A | 6/1996 | Larson et al. | 385/135 |
| 5,546,495 A | 8/1996 | Bruckner et al. | 385/135 |
| 5,613,030 A | 3/1997 | Hoffer et al. | 385/135 |
| 5,640,482 A | 6/1997 | Barry et al. | 385/135 |
| 5,689,604 A | 11/1997 | Janus et al. | 385/134 |
| 5,715,348 A | 2/1998 | Falkenberg et al. | 385/135 |
| 5,758,003 A | 5/1998 | Wheeler et al. | 385/134 |
| 5,788,087 A | 8/1998 | Orlando | 211/26 |
| 5,836,551 A | 11/1998 | Orlando | 248/49 |
| 5,898,129 A | 4/1999 | Ott et al. | 174/59 |
| 6,028,268 A * | 2/2000 | Stark et al. | 174/67 |
| 6,184,468 B1 * | 2/2001 | Speziale | 220/3.8 X |
| 6,194,662 B1 * | 2/2001 | Smith | 220/241 X |
| 6,207,899 B1 * | 3/2001 | Gillespie | 174/66 |
| 6,233,136 B1 * | 5/2001 | Peng | 361/600 |
| 6,265,662 B1 * | 7/2001 | Riedy et al. | 174/67 |
| 6,279,768 B1 * | 8/2001 | Mendoza et al. | 220/3.8 X |
| 6,281,434 B1 * | 8/2001 | Gretz | 174/48 |

* cited by examiner

Primary Examiner—Dean A. Reichard
Assistant Examiner—Dhiru R Patel
(74) Attorney, Agent, or Firm—Robert A. McCann (57) ABSTRACT

The present invention is directed to an enclosure having an outer shell, an inner subassembly slid into the outer shell, and a retractable cover movable between open and closed positions. Connector access cut-outs are defined in the outer shell. Due to the retractable cover and the connector access cut-outs, full access to the connectors housed in the enclosure is provided. The retractable cover also provides protection for those same connectors when desired. Thus, even though the number of connectors and cabling may increase, the difficulty in accessing them does not. Further, since the height of the enclosure of the present invention is approximately 5¼", a greater number of enclosures may be mounted on a standard rack.

27 Claims, 9 Drawing Sheets

ENCLOSURE FOR USE IN FIBER OPTIC MANAGEMENT SYSTEMS

FIELD OF THE INVENTION

The present invention relates to methods and apparatus for managing fiber optic connections and fiber optic cables as part of a fiber optic communication system. More particularly, the present invention relates to an enclosure for use in fiber optic cable management systems.

BACKGROUND OF THE INVENTION

Within recent years, there has been a rapidly increasing development and use of telecommunications in business and personal activities. Simultaneously, there has been an accelerating trend toward "convergence" in the telecommunications industry. That is, many historically distinct forms of telecommunications, e.g., telephone, data transmission, e-mail, radio, television, videoconference, internet access, and on-line applications, are being combined into a single channel of communication. This combination of factors is causing a paradigm shift m the amount of bandwidth necessary for telecommunications service to modem office buildings. The increased bandwidth requirements cannot be effectively satisfied by traditional copper cables, but, instead, requires switching to fiber optic cable.

Although much attention has been paid to the electrical and electronic techniques for using the bandwidth in fiber optic cable and for interconnecting the signals of copper cable and fiber optic cable, relatively less attention has been given to the unique physical needs of handling, connecting, and maintaining fiber optic cable. However, the mechanical devices that have been developed for handling copper cable do not work well for fiber optic cable because of its relatively delicate, yet technically precise nature.

For example, unlike copper cable, fiber optic cable cannot be readily cut and spliced on demand to make a desirable connection fit in the field. Rather, fiber optic cable is purchased in predetermined lengths, with connectors that have been installed in the factory. Field workers must utilize these predetermined lengths of cable, regardless whether the length is appropriate for the task at hand. At the same time, the relatively fragile and delicate nature of fiber optic cable prohibits bundling excess cable as might be done with copper cable. If fiber optic cable is excessively bent or stressed, the signal within may become seriously disrupted.

Moreover, it must be recognized that an operations center, such as occurs in the field of this invention, typically houses hundreds (and sometimes thousands) of fiber optic cables. It is particularly important that an operations center provide for installing the fiber optic cables in a manner that secures and protects any excess fiber optic cable without compromising its relatively delicate nature. Yet, in the event that equipment is changed or moved, each individual fiber optic cable must also be maintained in such a manner that it can be identified, isolated, and retrieved without unduly disturbing other fiber optic cables.

It should also be recognized that a fiber optic cable may be connected to a variety of different type devices which are also housed in the operations center, i.e., patch panels of different sizes, splicer drawers, connector modules, etc. There is a need within the industry for a fiber optic cable management system that may facilitate the substitution and replacement of one such device by another, without needing to remove or reinstall all of the fiber optic cable associated with the original device. Furthermore, when it is necessary to upgrade or repair equipment, whether fiber or copper, maintaining system operation during these procedures is an important consideration. Consequently, there is a need in the prior art for a cable management system organized in a manner that can remain operational during upgrading or maintenance.

The foregoing problems are made even more difficult because the operations center actually typically comprises a three-dimensional array of devices and fiber optic cables. That is, the operations center typically houses many columns and rows of such racks, with each rack containing a vertical array of devices attached to hundreds and possibly thousands of such fiber optic cables. Each such cable must be identifiable, retrievable, and replaceable, without disrupting the surrounding cables.

Finally, it must be recognized that all of the foregoing problems exist in a commercial environment without a single established standard for size. Historically, products within the "public network" were designed by AT&T and Western Electric, and utilized racks that were 23 inches wide, holding devices and enclosures that were 19 inches wide. The "public network" was then connected at some point to the premises in a particular building. Products intended for a "premises network" were historically based upon racks that were 19 inches wide, holding devices and enclosures that were 17 inches wide. The Telecommunications Act of 1996 has opened and triggered widespread competition within the telecommunications market. However, it has done so without establishing standards vis a vis the mechanical aspects of an operations center. Different companies are adopting different physical standards, and the line of demarcation between "public network" and "premises network" products is becoming fragmented and blurred. As a result, there is a particular need for an enclosure that can be used with both public network and premises network environments.

In such communications centers, space is a premium. A constant goal in providing connector modules in enclosures is to obtain the greatest number of connectors within the enclosure. To assist in achieving this goal, it is desirable to obtain a greater number of enclosures onto an industry standard rack. Thus, there is a need in the art for an arrangement that maximizes the number of connectors and the number of enclosures while still allowing sufficient hand access.

At times, it is necessary to access the connectors contained within an enclosure to remove or insert a connector therefrom. The commercially available enclosures, however, do not provide adequate access to the interior of the enclosures, especially when the density is increased. Thus, there is a need in the art for an enclosure that provides sufficient access to its interior.

SUMMARY OF THE INVENTION

The present invention meets a need of the prior art by providing an enclosure having an outer shell, an inner subassembly slid into the outer shell, and a retractable cover movable between open and closed positions. The height of the enclosure is such that a greater number of enclosures, and consequently connectors, can be provided on a rack than previously possible.

The present invention meets a further need of the prior art by providing an enclosure with connector access cut-outs on its upper and lower walls and a retractable cover. When the cover is in its open position, full access to the connector panel contained within the enclosure is possible. When the cover is in its closed position, the cover protects the connectors within the enclosure. Thus, unlike the enclosures of the prior art, the enclosure of the present invention facilitates superior access to its interior.

The present invention increases the number of enclosures, and consequently connectors, that can be provided on a rack while still enabling access to the connectors. Thus, the enclosure of the present invention results in connector density gains while providing sufficient spacing between the connectors such that a technician can access one connector without disturbing the adjacent connector.

DETAILED DESCRIPTION OF THE INVENTION

An enclosure made in accordance with the principles of the present invention is depicted in FIGS. 1–11. The present invention is to be used in a fiber optic cable management system such as the one shown in FIG. 1. The system 10 includes a frame 12, a plurality of enclosures 14, a slack manager 18, and a trough assembly 20. The enclosure 14 of the present invention generally comprises an outer shell 50, an inner subassembly 52, and a cover 55.

Referring to FIGS. 3, 6, 7, 9 and 10, the outer shell 50 has a generally rectangular shape and comprises four walls, an upper wall 57, a lower wall 59, and two side walls 62, 64 extending therebetween. The walls of the outer shell 50 define a front opening 66 and a rear opening 68. The walls are preferably constructed of metal.

Figure 1:
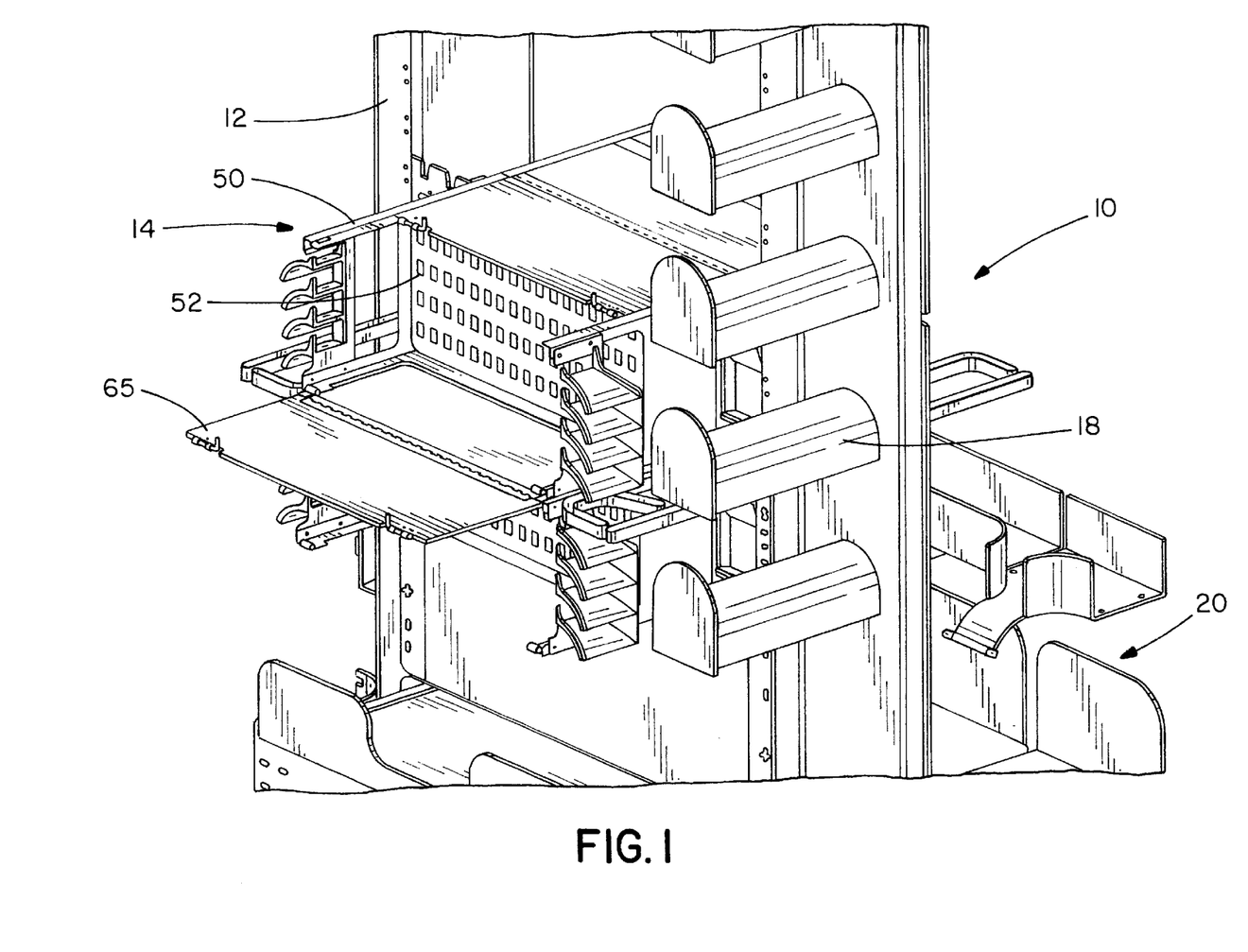
FIG. 1 is a perspective view of the present invention depicted in its working environment.
Figure 2:
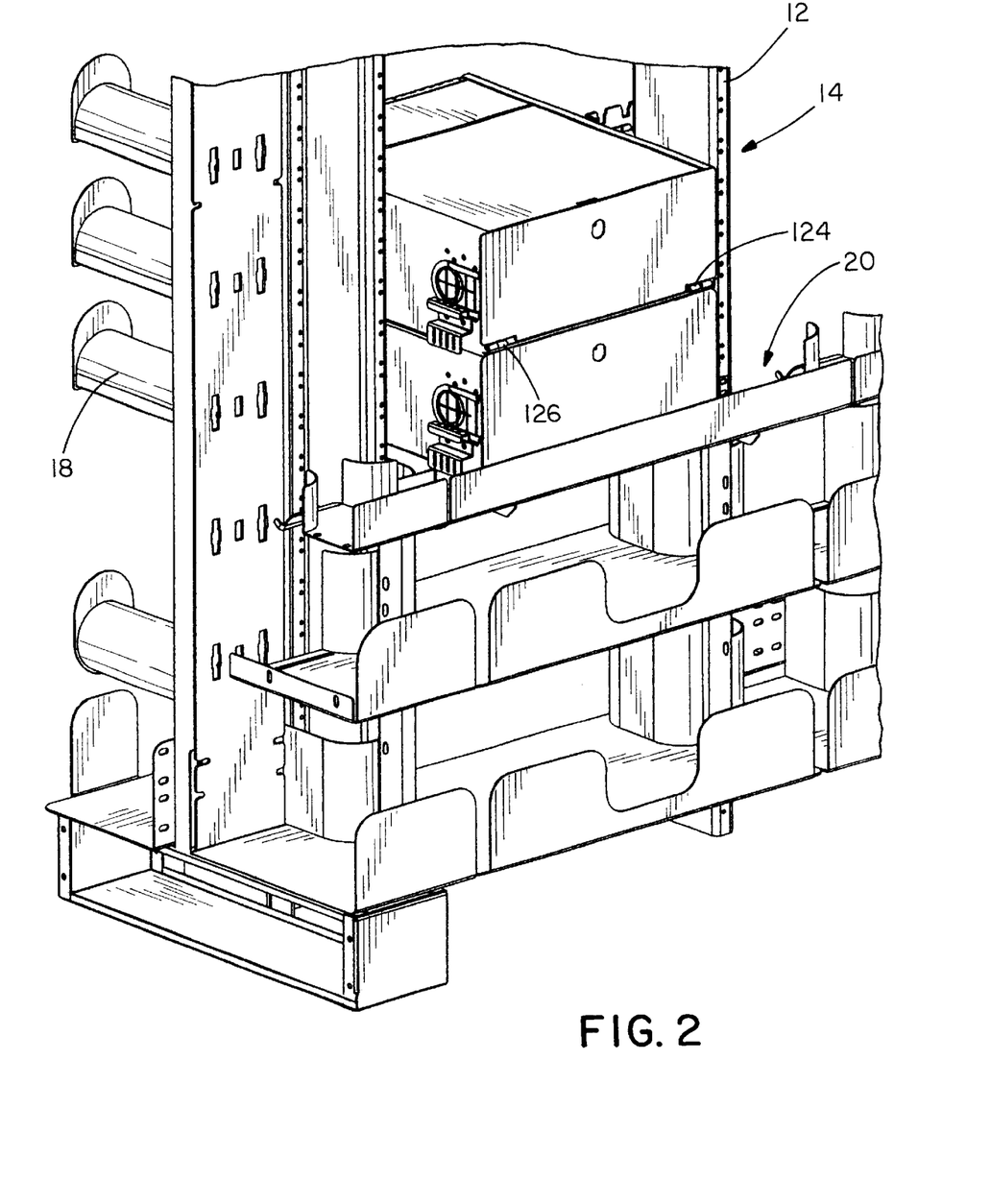
FIG. 2 is a similar view to FIG. 1, but depicting the present invention from the rear.
Figure 3:
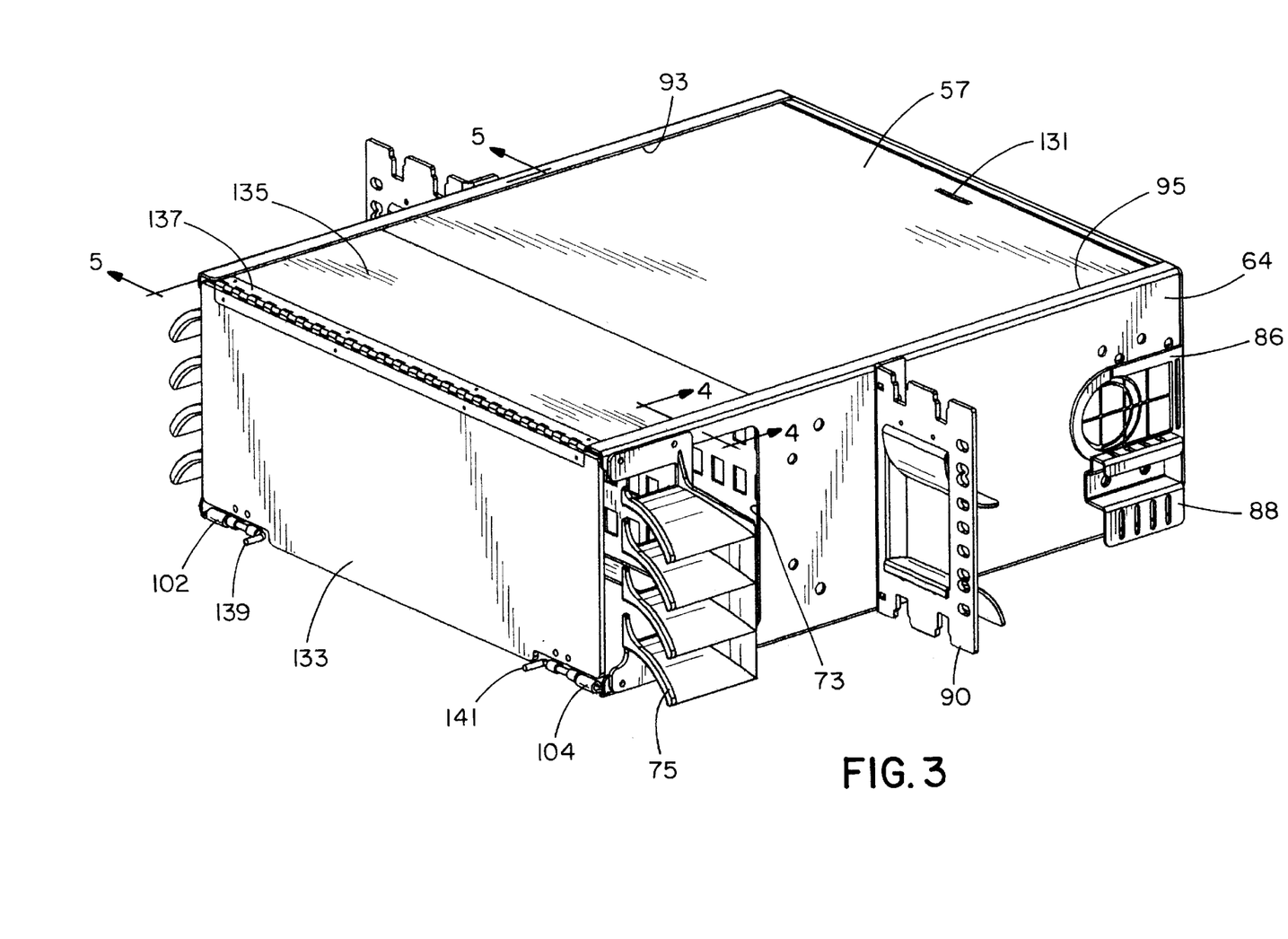
FIG. 3 is a perspective view of the enclosure of the present invention, depicted with the cover in a closed position.
Figure 4:
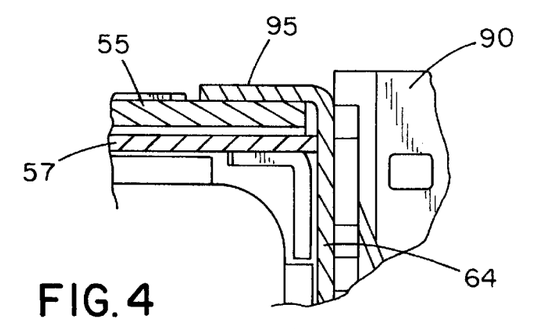
FIG. 4 is a cross-sectional view taken along line 4—4 of FIG. 3.
Figure 6:
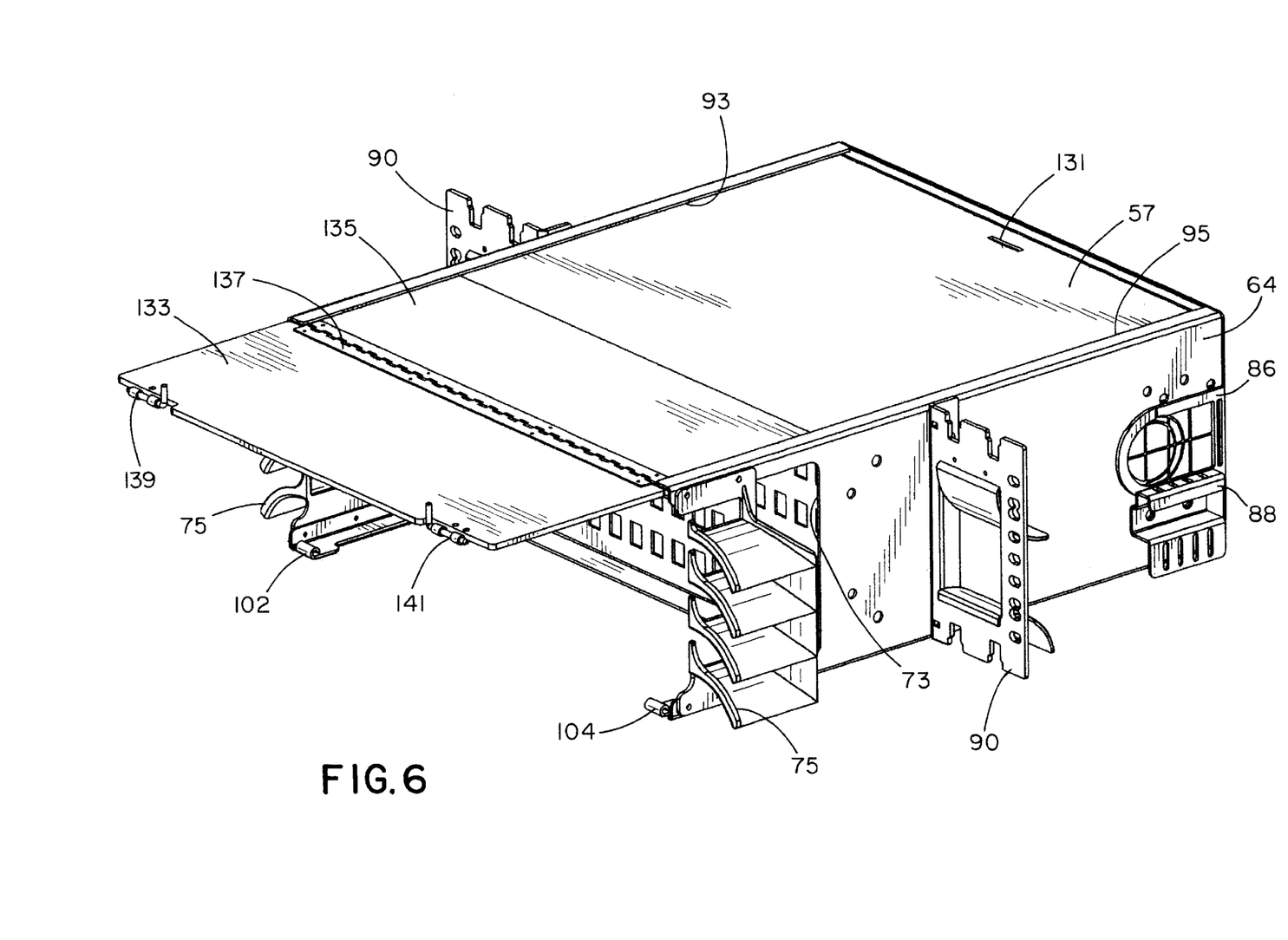
FIG. 6 is a similar view to FIG. 3, but depicting the cover in a partially open position.

At a forward end of each side wall 62, 64, an opening 71, 73 for accommodating a fanning strip is defined. An example of the fanning strip 75 that is used with the present invention is shown in FIGS. 1, 3, and 6. The fanning strip is the subject of U.S. Patent Application entitled "Vertical Cable Management System", mentioned above. The fanning strips help to prevent micro-bending of fiber optic cables as they exit the enclosure and are routed downwardly past a series of stacked enclosures.

Figure 10:
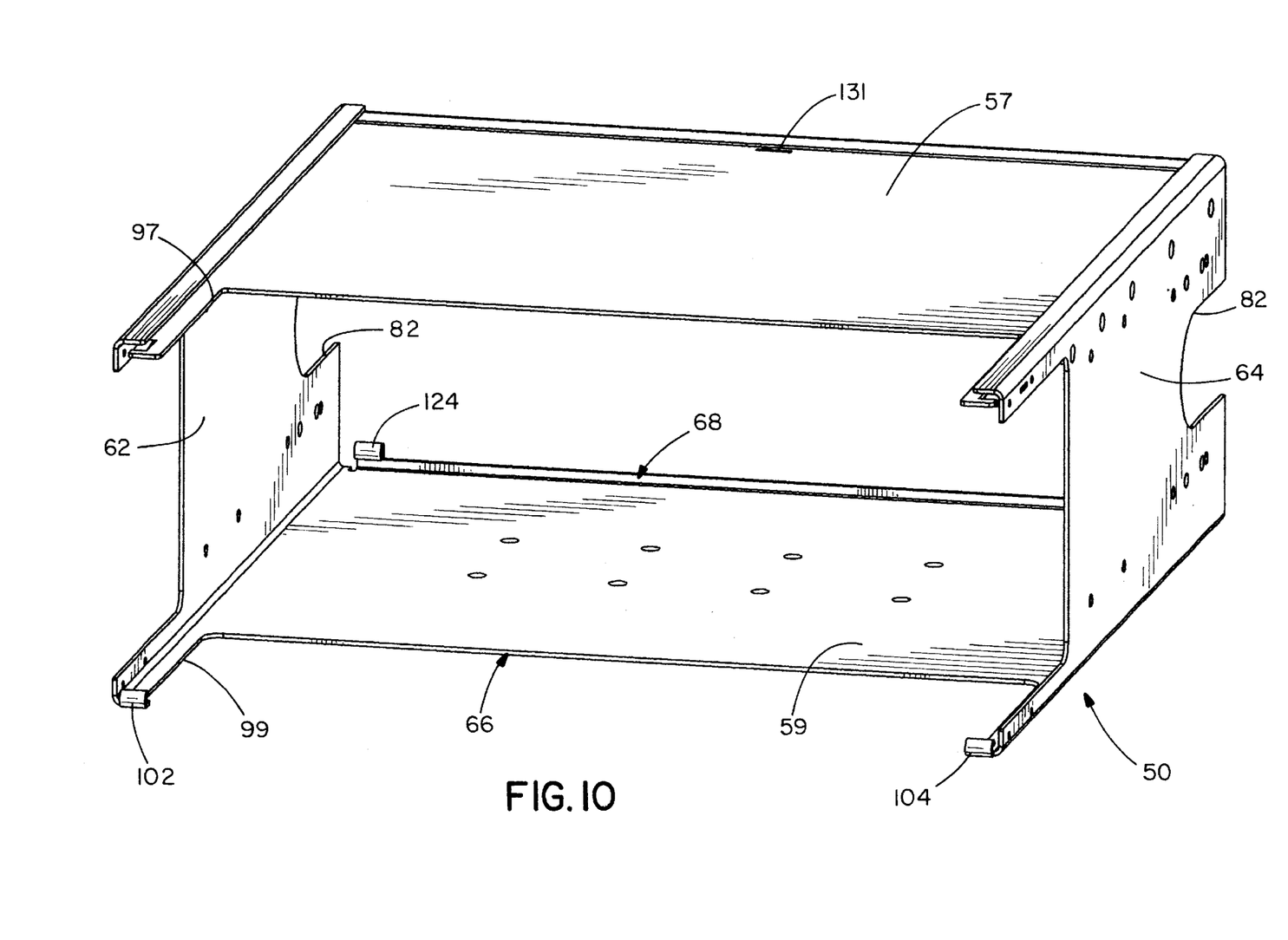
FIG. 10 is a perspective view of the outer shell of the present invention.

At the rear end of each side wall 62, 64, a partially elliptical opening 82 is defined in each side wall 62, 64. Within these openings, cable entry grommets 86 for cable entry and exit are accommodated. The grommet covers 86 prevent dust and contaminants from entering the enclosure. Below each grommet 86, an external cable clamp 88 is mounted. The clamps 88 provide secure cable strain relief for the cables that are to be terminated on the inside of the enclosure.

Positioned approximately in the middle of each side wall 62, 64, a mounting bracket 90 is provided. The mounting bracket is the subject of U.S. Patent Application entitled "Universal Mounting System for a Fiber Optic Management Center", mentioned above. The mounting bracket 90 enables the enclosure to be mounted on both 19" and 23" EIA and WECO racks. Thus, the enclosure is not limited to use with only one type of rack.

Referring particularly to FIGS. 3–8, the shell 50 includes two cover guides 93, 95 for guiding the cover 55. As can be best seen in FIG. 4, the top edge of each side wall 62, 64 is curved, thereby defining a lip that is parallel with the upper wall 57. These lips constitute the cover guides 93, 95. As can be seen from FIGS. 3, 6, and 7, the cover guides 93, 95 are positioned adjacent the edge of the upper wall 57 and extend its entire length. The function of the guides 93, 95 will be explained below, in discussing the cover 55.

As can be seen in FIG. 10, the upper and lower walls 57, 59 of the shell 50 define connector access cut-outs 97, 99. The cut-outs 97, 99 have a generally rectangular shape and extend across almost the entire front opening 66. They allow for easy access to the connectors contained within the enclosure.

The forward edges of the lower wall 59 are provided with a latching member 102, 104. The latching members 102, 104 cooperate with the latches of the cover 55, to be discussed below, to retain the cover 55 in the closed position.

Figure 11:
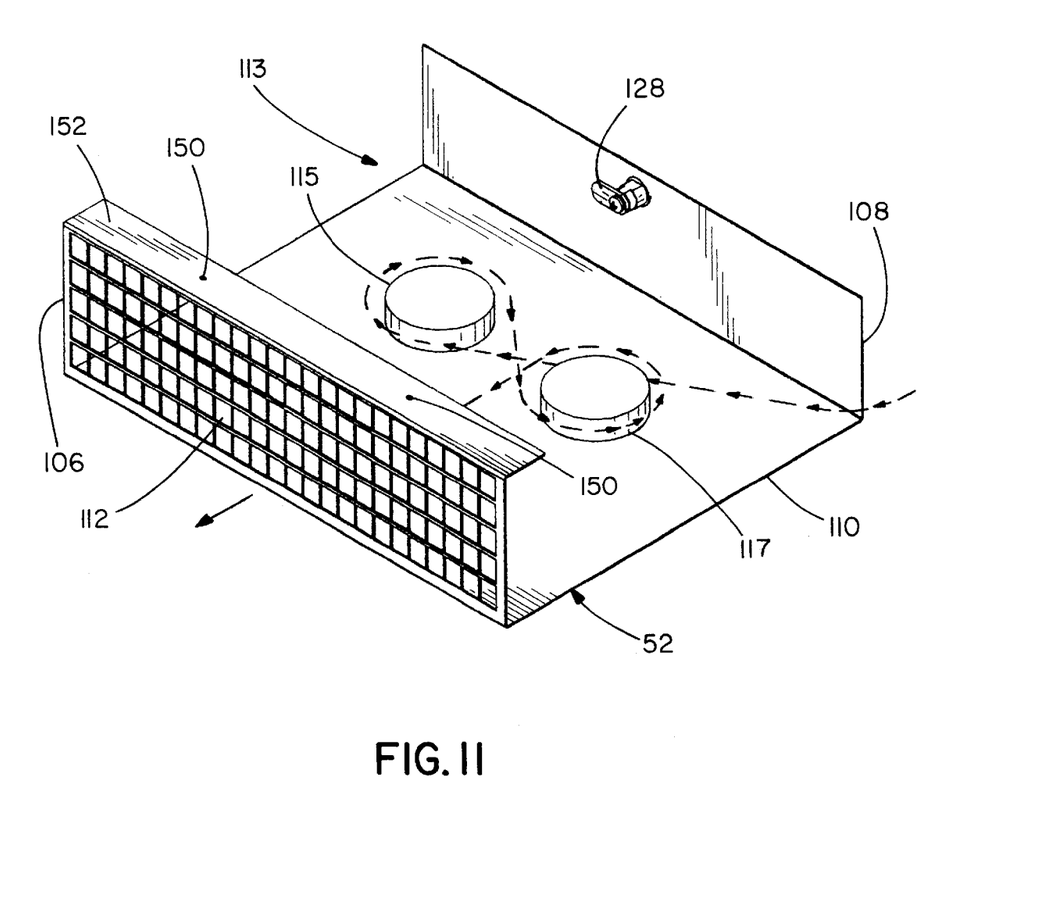
FIG. 11 is a perspective view of the inner assembly of the present invention.

The inner subassembly 52 of the present invention is shown in FIG. 11. The subassembly 52 includes a front connector panel 106, a rear wall 108, and a lower wall 110 extending therebetween. The connector panel 106 includes a plurality of adapter mounting openings 112. The lower wall 110 may be provided with an internal slack management system 113 including a left and a right post 115, 117. The path taken by a field fiber is depicted by the arrows. The fiber enters through the enclosure, past the right post 115, loops around the left post 117, then loops around the right post 115, and finally towards the connector panel 106.

Once the assembly 52 is slid into the shell 50, the rear wall 108 functions as a back door for the enclosure to provide security and protection for the terminated cables. The rear wall 108 is hinged to the lower portion 120 via hinges 124, 126 and is removable therefrom. In its closed position, the rear wall 108 prevents access from the rear opening 68 into the interior of the enclosure. The rear wall 108 is further provided with a locking member 128. The locking member 128 interacts with a slot 131 provided on the upper wall 57 of the shell 50 to lock the rear wall 108 in a closed position.

The cover 55 of the present invention is depicted in FIGS. 1–8 and includes first and second panels 135, 133 attached by a hinge 137. The first panel 135 of the cover 55 is preferably constructed of metal and the second panel 133 of the cover 55 is preferably constructed of Lexan®.

The cover 55 has two positions, a closed position and an open position. In the closed position, as shown in FIG. 3, the second panel 133 extends downwardly from the upper wall 57 and prevents access through the front opening 66 of the enclosure. When the second panel 133 is in this closed position, the first panel 135 covers the upper connector access cut-out 97. To keep the second panel 133 in the closed position, the lower edge of the second panel 133 is provided with latches 139, 141 along both sides. The latches 139, 141 mate with the latching members 102, 104 provided on the shell 50.

Figure 7:
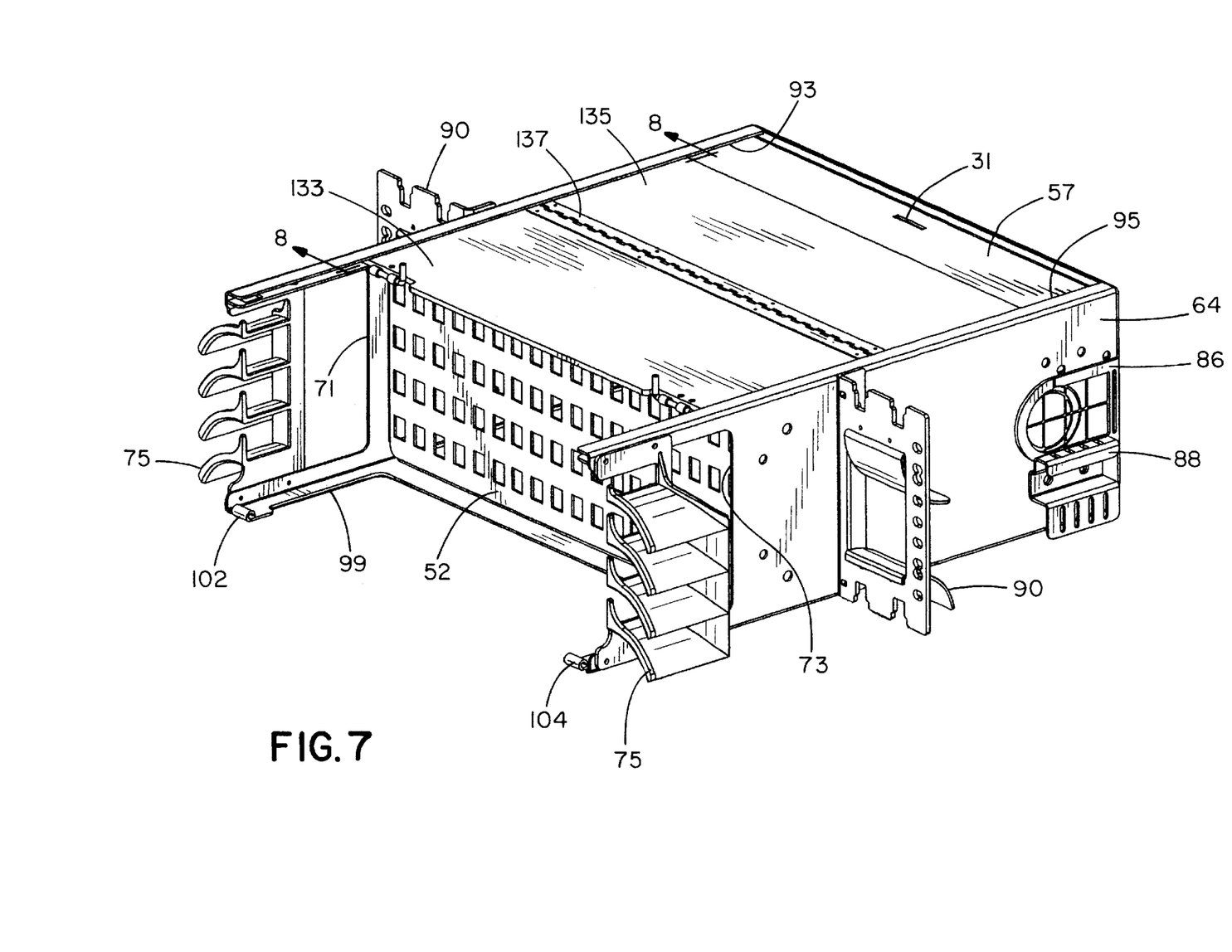
FIG. 7 is a similar view to FIG. 3, but depicting the cover in a fully open position.

To place the cover 55 in its open position, the lower edge of the second panel 133 is unlatched and the second panel 133 is pivoted about the hinge 137 until the second panel 133 is parallel with the first panel 135, as shown in FIG. 6. The cover 55 is then pushed back, toward the rear of the enclosure, causing the edges of both panels 133, 135 to slide between the upper wall 57 and the cover guides 93, 95. The open position of the cover 55 is depicted in FIG. 7. One advantage of the present invention is that the cover 55 protects the contents of the enclosure in its closed position, yet can allow full access to the enclosure in its open position.

Figure 5:
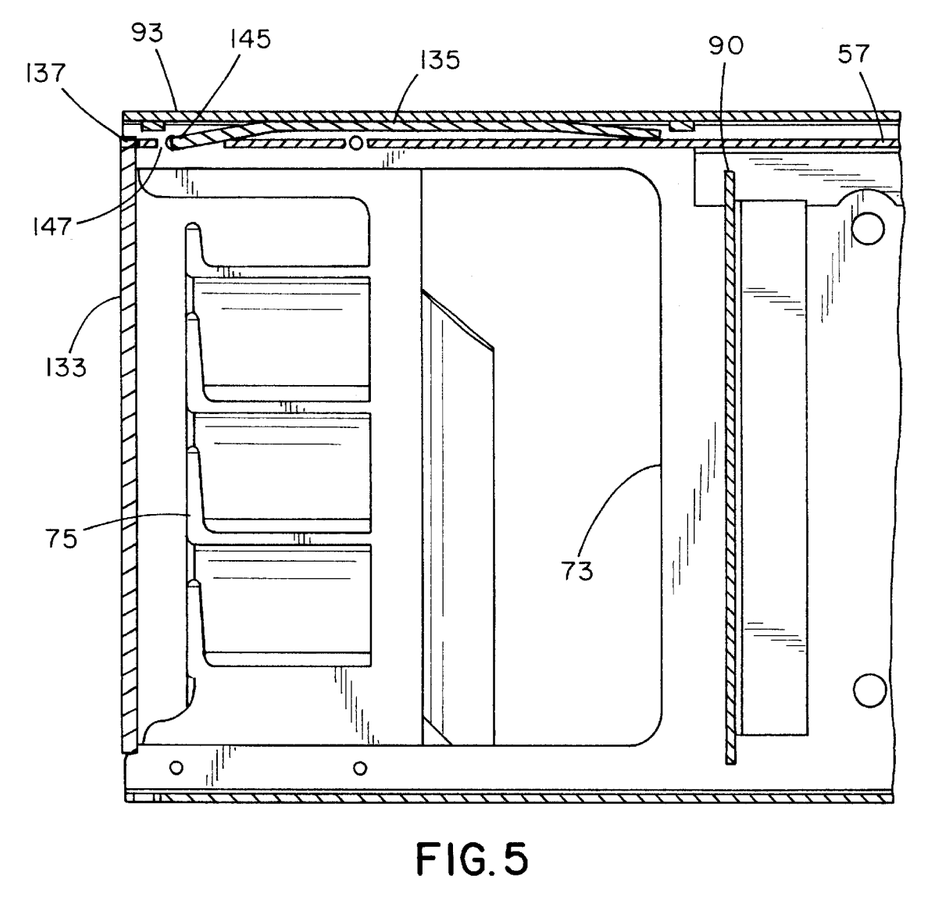
FIG. 5 is a cross-sectional view taken along line 5—5 of FIG. 3.
Figure 8:
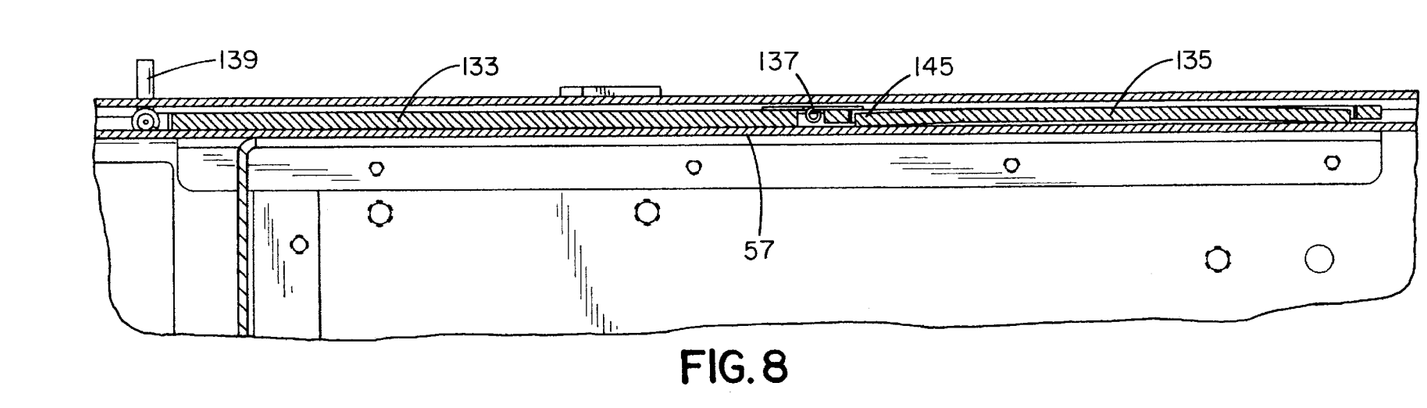
FIG. 8 is a cross-sectional view taken along line 8—8 of FIG. 7.
Figure 9:
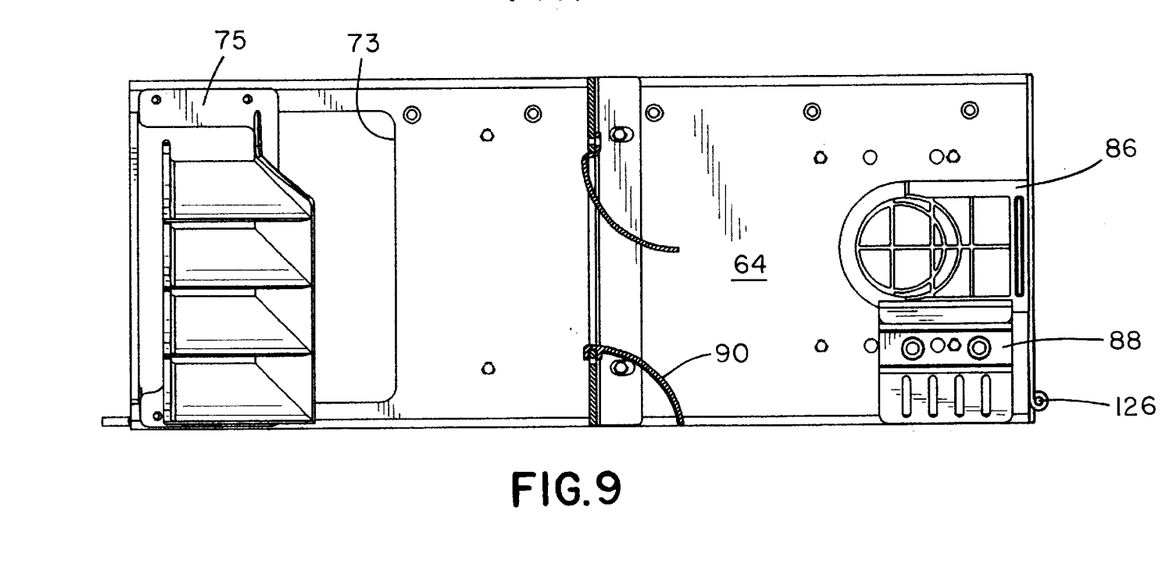
FIG. 9 is a side view of the enclosure of the present invention.

To limit the amount that the second panel 133 slides forward while moving from the open position to the closed position, the first panel 135 is provided with an indent 145, as depicted in FIG. 5. The upper wall 57 of the shell 50 is provided with an opening 147 to accommodate the indent 145. As the second panel 133 slides forward, from the position of FIG. 7 to the position of FIG. 6, its travel stops when the indent 145 of the first panel 135 mates with the opening 147 of the shell 50. At that point, the second panel 133 may be pivoted about the hinge 137 to the closed position and latched. When the indent is not mated with the opening 147, the indent 145 contacts the upper wall 57 of the outer shell, as shown in FIG. 8. The indent 145 does not hinder movement between the panel 135 and the upper wall 57 of the outer shell 50 when not mated with the opening 147.

To assemble the enclosure, the subassembly 52 is slid into the rear of the shell 50 and is secured thereto with suitable fasteners 150 such as screws. The subassembly 52 is slid into the outer shell 50 until the front connector panel 106 generally aligns with the cutouts 97, 99. The subassembly 52 then is attached to the shell 50 along the top edge 152 of the front connector panel 106. Once the outer shell 50 and the inner subassembly 52 have been attached, the cover 55 is slid onto the shell 50 and placed in its open position. The enclosure is then mounted to any rack via the mounting brackets 90. The inside of the enclosure may be configured for simple connectors or with an internal frame for value added modules. Thus, connectors appropriate for the enclosure configuration are inserted into the enclosure.

To maximize the number of enclosures provided on a standard rack, the height of the enclosure of the present invention is approximately 5.25". Thus, a total of twelve enclosures can be mounted on a standard EIA/TIA rack with a sufficient amount of space on the bottom for cable troughs. In comparison, the height of other commercially available enclosures is 7". Thus, the present invention enables a greater number of enclosures to be mounted onto a rack, which in turn allows a greater number of total connectors.

Although an enclosure of the present invention can accommodate up to 144 SC adapters. the preferred embodiment of the enclosure contains 72 connectors. For such an enclosure, the connection panel is provided with three rows of 24 connectors, each with vertical spacing between rows of 1.25" and horizontal spacing between connectors of 0.675". For a higher density enclosure accommodating 144 SC connectors, the connector panel is provided four rows of 36 connectors, each with vertical spacing between rows of 1" and horizontal spacing between connectors of 0.465". These arrangements achieve the connector density desired while having the least impact on hand accessibility to the connectors. In using the enclosure of the present invention, a technician will be able to access a connector without significantly disturbing an adjacent connector.

Due to the retractable cover and the connector access cut-outs, full access to the connectors housed in the enclosure is provided. This enables the connectors to be easily removed and inserted. The retractable cover also provides protection for those same connectors when desired. Thus, even though the number of connectors and cabling may increase, the difficulty in accessing them does not.

While the invention has been described in connection with certain embodiments, it should be understood that it is not intended to limit the invention to these particular embodiments. To the contrary, it is intended to cover all alternatives, modifications and equivalents falling within the spirit and scope of the invention.

What is claimed is:

1. An enclosure for use in a cable management system comprising:
   an outer shell having a generally rectangular shape and defining a front opening and a rear opening; an inner subassembly positioned within the outer shell; and
   a retractable cover provided on the outer shell and movable between an open position allowing access into the enclosure and a closed position in which access into the enclosure is restricted, wherein the cover comprises a first and a second panel, the second panel being attached to the first panel by a hinge.

2. The enclosure of claim 1 wherein the outer shell comprises an upper wall, a lower wall, and first and second side walls extending therebetween.

3. The enclosure of claim 2 wherein the upper wall and the lower wall are each provided with a cut-out for accessing an interior of the enclosure.

4. The enclosure of claim 2 wherein a mounting bracket is attached to each side wall of the outer shell for mounting the enclosure onto a rack.

5. The enclosure of claim 2 wherein an opening is defined in each side wall for accommodating a grommet for cable entry and exit.

6. The enclosure of claim 2 wherein a cable clamp is mounted on each of said side walls.

7. The enclosure of claim 2 wherein an opening is defined at a forward end of each of said side walls for accommodating a fanning strip.

8. The enclosure of claim 1 wherein the inner subassembly includes a front panel, a rear wall, and a lower wall extending therebetween.

9. The enclosure of claim 8 wherein the panel defines a plurality of adapter mounting openings.

10. The enclosure of claim 8 wherein the upper wall and the lower wall of the outer shell are each provided with a cut-out for accessing an interior of the enclosure.

11. The enclosure of claim 10 wherein the cut-outs extends from a front edge of the respective wall to the plane of the panel.

12. The enclosure of claim 8 wherein the rear wall is hinged to the lower wall of the subassembly, the hinged rear wall allowing access into the enclosure.

13. The enclosure of claim 12 wherein the rear wall is removable from the subassembly.

14. The enclosure of claim 1 wherein the cover is movable between a closed position and an open position.

15. The enclosure of claim 14 wherein, in the closed position, the second panel covers the front opening of the enclosure and the first panel covers a cut-out of the enclosure.

16. The enclosure of claim 14 wherein, in the open position, the first and second panels are parallel to one another and full access to the enclosure is allowed.

17. The enclosure of claim 14 wherein the second panel is provided with at least one latch for mating with at least one latching member provided on the outer shell to keep the cover in its closed position.

18. The enclosure of claim 14 further comprising a cover guide for guiding the first and second panels between the open and closed positions.

19. The enclosure of claim 14 further comprising a stop for preventing movement of the first panel with respect to the outer shell.

20. An enclosure comprising: a plurality of walls having a generally rectangular shape, the plurality of walls comprising an upper wall, a lower wall, and two side walls extending therebetween; and a retractable cover provided on the enclosure and movable between an open position allowing access into the enclosure and a closed position in which access into the enclosure is restricted, wherein the cover comprises a first and a second panel, the second panel being attached to the first panel by a hinge.

21. The enclosure of claim 20 wherein the upper and the lower wall each define a cut-out for accessing an interior of the enclosure.

22. The enclosure of claim 21 wherein the side walls are provided with brackets for mounting the enclosure on any cable management rack.

23. The enclosure of claim 22 wherein the height of the enclosure is approximately 5.25".

24. The enclosure of claim 23 wherein the enclosure can accommodate at least 72 connectors.

25. The enclosure of claim 23 wherein the enclosure can accommodate up to 144 connectors.

26. The enclosure of claim 22 further comprising a rear hinged wall for providing access to the interior of the enclosure.

27. The enclosure of claim 26 wherein the rear wall is removable from the enclosure.

* * * * *